March 15, 1960  M. J. DRAGANJAC  2,928,187
RADIO RANGE COURSE SIMULATOR
Filed Dec. 22, 1955  2 Sheets-Sheet 1

INVENTOR.
Michael J. Draganjac
BY W. L. Strut

HIS ATTORNEY

March 15, 1960  M. J. DRAGANJAC  2,928,187
RADIO RANGE COURSE SIMULATOR
Filed Dec. 22, 1955  2 Sheets-Sheet 2

INVENTOR.
Michael J. Draganjac
BY W. L. Strut

HIS ATTORNEY

United States Patent Office 2,928,187
Patented Mar. 15, 1960

2,928,187

RADIO RANGE COURSE SIMULATOR

Michael J. Draganjac, Etna, Pa., assignor to Westinghouse Air Brake Company, Wilmerding, Pa., a corporation of Pennsylvania Application December 22, 1955, Serial No. 554,741

6 Claims. (Cl. 35—10.2)

This invention relates to training aids, and particularly to an improved radio range course simulator for flight trainers.

In order to afford the most complete preflight training for pilots, a flight simulator must be provided not only with the usual flight controls and instruments, but also with simulations of the navigational aids which the pilot will encounter in operational aircraft. Important among these is the aural radio range. In the actual operation of this system, a ground based transmitter is employed to broadcast overlapping directional beams modulated at a suitable audio frequency, one beam being modulated with the code letter "A" (.—) and the adjacent beams being modulated with the code letter "N" (—.). These signals have the property that if received simultaneously with equal intensity, a solid tone is heard. When the pilot hears such a tone, he knows that he is on one of the four course legs established by the station to which he is tuned. At intervals, the transmission of the course signals is interrupted, and station identification signals are broadcast so that the pilot can positively identify the range station to which his receiver is tuned. It is a primary object of this invention to provide a simple and inexpensive simulation of the signals provided by such a radio range station, which may be incorporated in a flight trainer.

In theory, the ideal location of the course legs established by a radio range station would be with the legs at right angles. In practice, however, due to the nature of the terrain surrounding the station and other factors, it is found that these legs may be located at various angles. Accordingly, it is a further object of the invention to provide a radio range course simulator in which the simulated course legs may be located at any mutual angles.

It is a further object of my invention to provide a radio range course simulator incorporating a potentiometer adapted to be supplied with two complementary code modulations to produce an output signal simulating the radio range signals received by a pilot during flight.

It is a further object of my invention to provide an improved potentiometer structure for combining a plurality of electrical input signals in desired proportions to produce a single output signal.

It is a further object of my invention to provide a radio range course simulator of the class described incorporating means to simulate both radio range signals and station identification signals.

It is a further object of my invention to provide a modulator for simulating the signals transmitted by a radio range station in which complementary code modulations and station identification modulations are alternately and periodically produced.

Other objects and further advantages of my invention will be apparent to those skilled in the art as the description proceeds.

I shall describe one embodiment of my invention, and shall then point out the novel features thereof in claims.

In the drawings.

Corresponding parts are given the same reference numerals in each of the figures.

Figure 1:
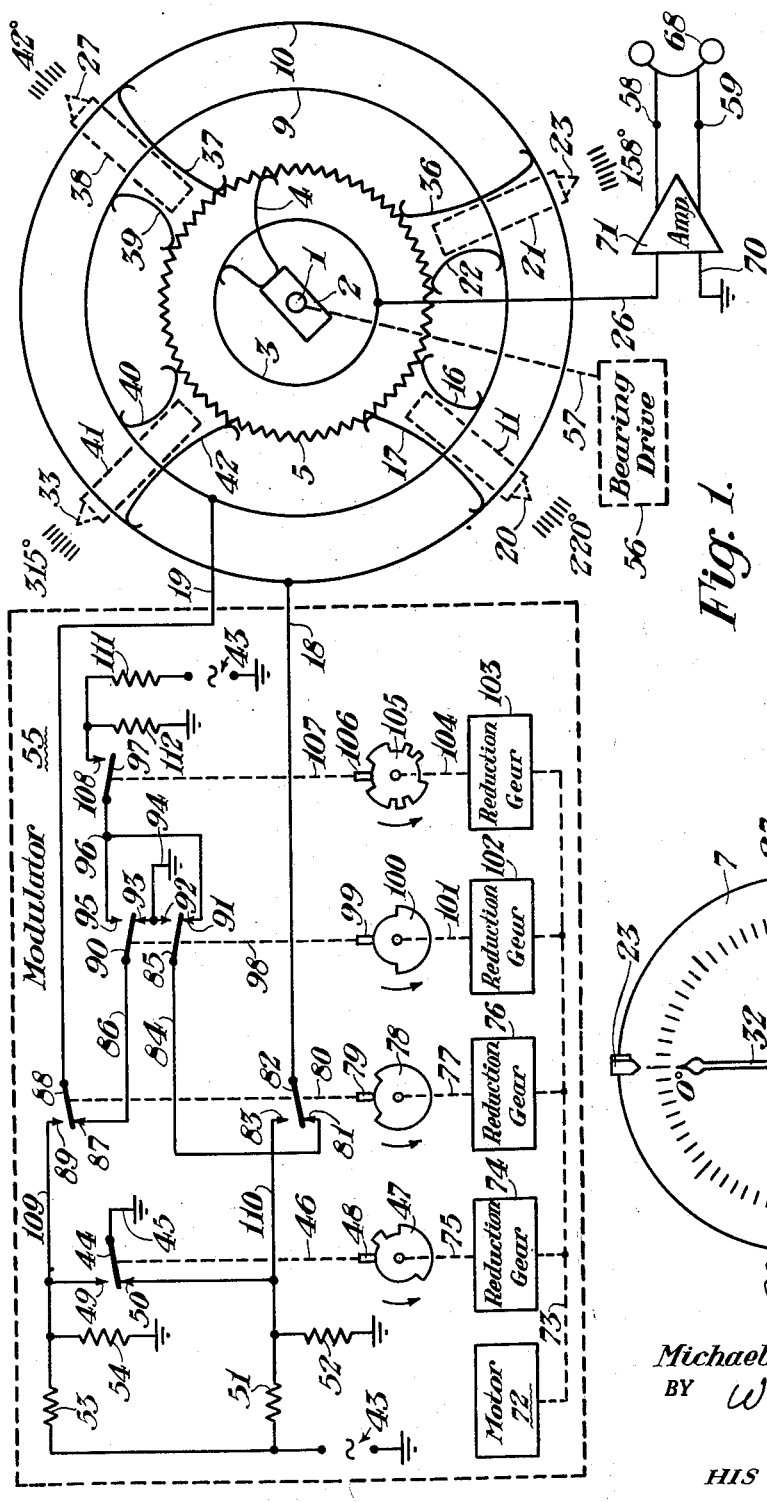
Fig. 1 is a schematic drawing of one embodiment of my invention.

With reference to Fig. 1, 55 is a modulator employed to derive the coded signals simulating those broadcast by a radio range station. These signals are impressed, in a manner to be described, on a carrier comprising a suitable source 43 of alternating voltage of any suitable audio frequency, which might for example be 1020 cycles per second.

The modulator output signal appearing on leads 18 and 19 varies over a cycle which may have a duration of, for example, 37½ seconds. During the first 30 seconds of this cycle, the Morse letter "A" (.—) is modulated on lead 18 and the complementary Morse letter "N" (—.) is modulated on lead 19 in a manner to be described. During the remaining portion of the cycle, a station call signal is modulated, first on lead 18 while lead 19 is grounded, and then on lead 19 while lead 18 is grounded, in a manner to be described.

The above described cycle of operation is controlled by a plurality of cams 47, 78, 100, and 105 which are driven from a suitable motor 72 by conventional means. As schematically shown, a shaft 73 connected to motor 72 drives reduction gears 74, 76, 102 and 103. Cam 47 is driven from reduction gear 74 by shaft 75. Cam 78 is driven from reduction gear 76 by shaft 77. Cam 100 is driven from reduction gear 102 by shaft 101. Cam 105 is driven from reduction gear 103 by shaft 104.

Cams 47, 78, 100 and 105 are associated with cam followers 48, 79, 99 and 106, respectively, which actuate contact members in a manner to be described through conventional actuating members indicated schematically at 46, 80, 98 and 107, respectively. Contact 44 engages contact 49 when cam follower 48 encounters a raised portion of cam 47, and engages contact 50 when cam follower 48 rests on a depressed portion of cam 47 as shown. Similarly, contacts 82 and 88 engage either contacts 83 and 89 or 81 and 87, respectively, depending on the angular position of cam 78; contacts 85 and 90 engage contacts 92 and 95 or contacts 91 and 93, respectively, depending upon the position of cam 100; and contact 97 engages its sole contact 108 when cam follower 106 engages a raised portion of cam 105.

The function of cam 47 is to impress on leads 109 and 110 complementary code modulations corresponding to the code letters "A" and "N." The carrier voltage from source 43 is applied in parallel to opposed contacts 49 and 50 through a voltage divider network. As shown, contact 49 is connected to one terminal of source 43 through resistor 53 and to the grounded terminal of the source through resistor 54. Contact 50 is connected to one side of a source 43 through resistor 51 and is connected to ground through resistor 52.

Cam operated switch arm 44 cooperates with contacts 49 and 50 in the manner previously described. Arm 44 is connected directly to ground. Assuming cam 47 to rotate counter-clockwise from the position shown, as follower 48 engages the short raised portion of the cam, arm 44 will engage contact 49 and ground lead 109 and at the same time a voltage corresponding to the portion of the source voltage appearing across resistor 52 will appear between lead 110 and ground. This condition will exist for a time proportional to the length of the raised portion, and the signal on lead 110 will correspond to the first dot of the code letter "A." As follower 48 drops into the depression behind the first raised portion, arm 44 will engage contact 50, grounding lead 110, and a voltage will appear briefly on lead 109 corresponding to the dot of the code letter "N." As follower 48 rides up on the wide raised portion of cam 47, a voltage of relatively long duration will appear on lead 110, corresponding to the dash of the code letter "A," and lead 109 will be grounded for this period of time, corresponding to the space of time between code letter groups. As follower 48 drops into the wide depression following the wide raised portion, lead 110 will be grounded for a time representing the space between code letter groups and there will be a voltage between lead 109 and ground corresponding to the first dash of the letter "N." The cycle just described will then be repeated.

It can be seen from the foregoing that lead 109 will be modulated with a signal representing the repeated Morse code letter "N," and lead 110 will be repeatedly modulated with the Morse code letter "A." Due to the grounding of switch arm 44, when a code pulse is being transmitted by either lead 109 or lead 110, the other lead is grounded.

The purpose of cam 78 is to establish the previously referred to operating cycle which may be 37½ seconds, and to divide the cycle into a 30 second range signal transmission period and a 7½ second station identification period. Actual radio range stations generally transmit 12 A—N pairs during the range transmission portion of the cycle, and transmit one complete station identification signal in the "A" quadrants followed by one complete station identification signal in the "N" quadrants during the station identification portion of the cycle. Since, as will appear from the above description, one revolution of cam 47 corresponds to the transmission of one A—N pair, it follows that cam 47 will make approximately one revolution in 2½ seconds, and will make 15 revolutions during one revolution of cycle timing cam 78. Accordingly, reduction gears 74 and 76 are designed such that cam 78 makes one revolution in 37½ seconds while cam 47 makes one revolution in 2½ seconds. The raised portion of cam 78 corresponds to the 30 second range transmission portion of the operating cycle, and during this period switch arms 82 and 88 engage contacts 83 and 89, respectively, to connect leads 109 and 110 to modulator output leads 19 and 18, respectively. The depressed portion of cam 78 corresponds to the station identification portion of the cycle, and at this time switch arms 82 and 88 are connected to contacts 81 and 87 as shown in the drawing, connecting leads 84 and 86 to output leads 18 and 19, respectively. The station identification signals are impressed on leads 84 and 86 in a manner to be described.

The function of cam 105 is to produce a simulated station identification call signal. Since one station call signal must be transmitted to the "A" quadrants and one to the "N" quadrants during the 7½ second station identification period, cam 105 must make two revolutions in 7½ seconds, or one revolution in 3.75 seconds. This is 10 times the speed of shaft 77 which drives cam 78, and reduction gear 103 is designed accordingly. As an example only, cam 105 has been shown constructed to produce the station identification letters TIK. The raised portions of the cam correspond to the dots and dashes of this signal expressed in Morse code, in a manner which will be obvious to those skilled in the art. As each raised portion of cam 105 is encountered, switch arm 97 engages contact 108 to apply a pulse of voltage to terminal 96 from source 43 through a conventional voltage divider as indicated by resistors 111 and 112 for periods corresponding to the length of the dots and dashes, respectively.

Cam 100 functions to divide the station identification signals between the "A" and "N" quadrants. Cam 100 accordingly rotates once for every two revolutions of cam 105, and the resulting five to one differential in speed between cam 100 and cam 78 is accounted for in the design of reduction gear 102. It will appear at this point that the relative speeds of shafts 75, 77, 101 and 104, respectively, are 15, 1, 5, and 10. It will be understood that these figures are merely exemplary, since other ratios might be employed by suitable design of the cams. When the depressed portion of cam 100 engages follower 99 as shown in the drawing, switch arms 85 and 90 are connected to contacts 91 and 93, respectively. Accordingly, with switch arms 82 and 88 down, corresponding to the station identification portion of the operating cycle, lead 19 will be connected to ground over switch arm 88, contact 87, lead 86, switch arm 90, and contact 93 to ground at 94. Output lead 18 will be connected to terminal 96 over arm 82, contact 81, lead 84, arm 85, and contact 91 to terminal 96. During 180 degrees of rotation of cam 100, the station identification signal TIK will accordingly be applied to lead 18 in terms of pulses of voltage from source 43, while lead 19 will be grounded. During the succeeding 180 degrees of rotation of cam 100, switch arms 85 and 90 will engage contacts 92 and 95 to ground lead 18 by an obvious circuit and to apply the voltage at terminal 96 to lead 19 over an obvious circuit including switch arm 90 and contact 95.

When the raised portion of cam 78 engages follower 79, although the above described modulating action produced by cams 105 and 100 continues, it does not result in an output on leads 18 and 19 because these leads are disconnected at switch arms 88 and 82. During this portion of the cycle, leads 109 and 110 are connected to leads 19 and 18 through contact 89 and arm 88 and contact 83 and arm 82, respectively.

It will appear from the above description that modulator 55 produces a signal at leads 18 and 19 which consists of pulses of the letter "A" applied to lead 18 while lead 19 is grounded and pulses of the letter "N" applied to lead 19 while lead 18 is grounded. "A" and "N" are coded for 30 seconds, then station identification letters, here given for example as TIK, are impressed on lead 18 for 3.75 seconds, and the station identification letters are impressed on lead 19 for the subsequent 3.75 seconds. Leads 18 and 19 may be considered as a pair of transmission lines which simulate the leads to the "A" and "N" towers of a radio range station.

Lead 19 is connected to current collecting means such as a slip ring 9 and lead 18 is connected to current collecting means such as a concentric slip ring 10. Slip ring 9 is connected to a closed potentiometer winding 5 through wipers 16, 22, 39, and 40. Slip ring 10 is connected to winding 5 through wipers 17, 36, 37 and 42. Winding 5 and slip rings 9 and 10 may be considered fixed with respect to the chassis of the instrument. Wipers 16 and 17 are mounted on an adjustable member 11 carrying an indicating pointer 20. Member 11 is mounted in a manner to be described to rotate about winding 5, carrying wipers 16 and 17 to desired positions in contact with the winding. Pointer 20 is adapted to cooperate with a suitable scale, to be described, graduated in angular divisions from 0 to 360° as indicated by the markings shown adjacent the pointer. Wipers 40 and 42 are similarly mounted on an adjustable member 41, wipers 37 and 39 are mounted on member 38, and wipers 22 and 36 are mounted on member 21. These members carry pointers 33, 27 and 23, respectively, cooperaitng with the fixed scale in the manner indicated with respect to pointer 20.

A central shaft 1 is driven by a suitable bearing drive device 56 through a mechanical connection indicated schematically at 57. The bearing drive device 56 may be a conventional servomechanism of known type employed in flight trainers to produce an output movement representing the bearing of the simulated aircraft to a range station, which changes in response to pilot movements of the trainer's controls. Since the details of this device form no part of the present invention, they are not shown. Shaft 1 carries a block 2 on which is mounted a wiper 4 cooperating with current collecting means such as slip ring 3 and winding 5. Slip ring 3 is connected through lead 26 to the input of a conventional isolating amplifier 71 which is grounded at 70. The output of amplifier 71 is connected to a pair of output terminals 58 and 59. The output terminals may be connected across any suitable utilization device, such as a pilot's headphones 68 adapted to be mounted in the flight trainer, not shown. As will presently appear, the signal appearing across terminals 58 and 59 simulates that received by a pilot flying in the neighborhood of a radio range station.

Figure 4:
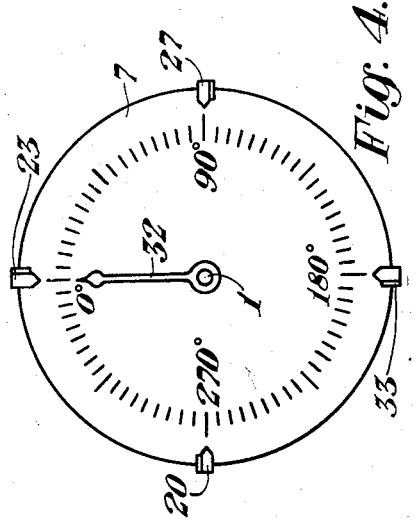
Fig. 4 is a front view of the potentiometer shown in Fig. 2.
Figure 2:
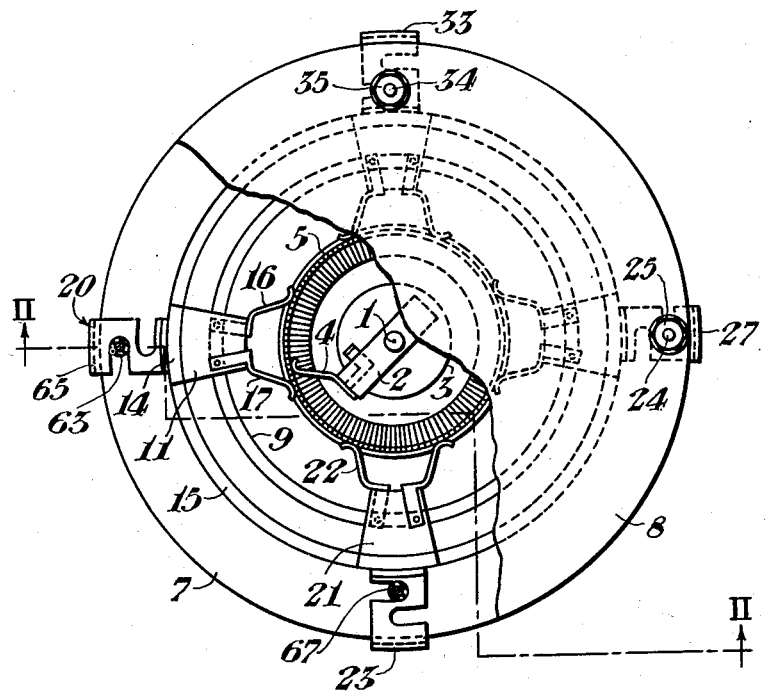
Fig. 2 is a rear elevation of a potentiometer used in the apparatus of Fig. 1.
Figure 3:
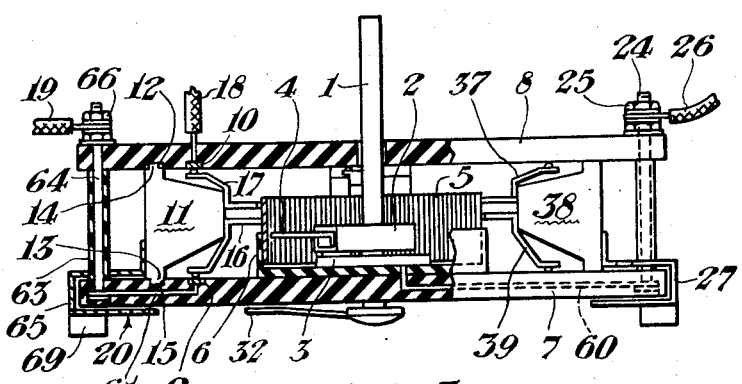
Fig. 3 is a plan view of the potentiometer shown in Fig. 2 with parts broken away and parts in section.

The physical structure of the potentiometer employed in the present invention may correspond to that exemplified in Figures 2, 3 and 4. The apparatus is shown mounted between outer and inner plates 7 and 8, which may be of any suitable insulating plastic composition.

As shown in Fig. 4, outer plate 7 is provided with a scale graduated in angular degrees from 0 to 360. Pointers 20, 23, 27 and 33, described in connection with Fig. 1, cooperate with this scale to indicate the angular bearing of the four course legs of the simulated range station. Pointer 32 also cooperates with this scale, and is driven by shaft 1 in response to the simulated bearing of the simulator, as described in connection with Fig. 1. The instrument is preferably mounted in the panel of the instructor's console of the flight trainer. Accordingly, the instructor can note the student pilot's bearing, as indicated by needle 32, as he attempts to fly one of the course legs established by pointers 20, 23, 27 and 33.

As shown in Figures 2 and 3, the adjustable course leg members such as 11 are mounted for rotation about winding 5 by means of lugs 13 and 14 slidable in grooves 12 and 15 formed in the inner faces of cover plates 7 and 8. Wipers 16 and 17 are fixed to member 11. Wiper 17 cooperates with winding 5 and a slip ring 10 mounted in the inner face of plate 8. Ring 10 is connected to modulator 55 through lead 18 (see Fig. 1). Wiper 16 cooperates with winding 5 and slip ring 9 mounted on the inner face of plate 7. Ring 9 is connected through lead 61 moulded in plate 7 and stud 64 to lead 19, which corresponds to the other terminal of modulator 55 as shown in Fig. 1. Pointer 20 is connected to member 11 by a metal strap 65. Strap 65 may have formed thereon a lug 69 for manual adjustment of the pointer. Plates 7 and 8 may be held apart by spacers such as 63 around stud 64, which may be threaded for engagement with nut 66 to simultaneously secure the parts together and complete the electrical connection to lead 19.

Strap 65 may be formed with an outer groove to engage spacer 63 in the position shown in Fig. 2 and an inner groove to engage the similar spacer surrounding bolt 34 in the extreme position of member 11 rotated 90° clockwise from the position shown. For this purpose, spacers such as 67 and that surrounding bolt 34, not shown, are mounted closer to the center of the cover plate than spacers 63 and that surrounding bolt 24, not shown. In this manner, a substantially 90° movement of each of the adjustable members is provided.

The structural details of members 21, 38 and 41 (Fig. 1) and their associated wipers and leads correspond to that just described for member 11, and it is believed that these structures will be obvious from the description of member 11 without further detailed description.

Inner slip ring 3 could obviously be made in the form of a ring, but as here shown is made in the form of a disc attached to the inner face of cup-shaped member 6, which holds winding 5. Disc 3 is connected to lead 26 through lead 60 moulded in plate 7 and bolt 24 as shown. Disc 3 is engaged by a wiper 4 mounted on a block 2 which is mounted to rotate with shaft 1. Wiper 4 has a second contacting portion engaging the inner periphery of winding 5 as shown.

In operation, the pilot's headphones are connected to terminals 58 and 59 and pointers 20, 23, 27 and 33 are set by the instructor to correspond with the bearing of the course legs of the range station being simulated. Assuming that these range legs have the respective compass bearings 42°, 158°, 220° and 315°, as shown in Fig. 1, the operation of the instrument is as follows. As previously described, during the range signal transmission period the signal pulses corresponding to the code letters "A" and "N" are alternately impressed on leads 18 and 19, respectively, and thence on slip rings 10 and 9, respectively. During the period of transmission of the pulses of the "A" group on lead 18 and slip ring 10, lead 19 and slip ring 9 are grounded through contact 44 and ground lead 45. Accordingly, winding 5 may be considered to be grounded at wipers 39, 40, 16 and 22 at this time. The "A" signal pulses are then conducted through wipers 17, 36, 37 and 42, portions of resistance 5, wipers 39, 40, 16 and 22, slip ring 9, lead 19, contact 49 and arm 44 to lead 45 and ground. Accordingly, the portions of resistance 5 between wipers 36 and 37 and 17 and 42, respectively, are at a constant potential proportional to the voltage level of the pulses on lead 18. Therefore, with wiper 4 in the position shown, or in any angular position between wipers 36 and 37 or 17 and 42, a single signal comprising the repeated code letter "A" will be conducted over wiper 4, contact member 3, lead 26, amplifier 71 and through the pilot's earphones across terminals 58 and 59. On hearing this signal, the pilot will know that he is in one of the "A" quadrants of the range course and that he should manipulate the trainer to bring its simulated position onto one of the course legs. As he carries out this maneuver, bearing drive device 56 will rotate shaft 1 and wiper 4 to indicate the simulated change in bearing of the aircraft to the range station. Assuming that the pilot is in the quadrant between 42° and 158° and chooses to fly north, or upwardly in the drawing of Fig. 1, wiper 4 will eventually be in contact with winding 5 in the area between wipers 37 and 39. At this time, during the transmission of the "A" signals wiper 39 will be grounded, while during the transmission of the "N" signals over lead 19 wiper 37 will be grounded. If wiper 4 is directly opposite wiper 37, no "N" signal will be heard since wiper 4 will be grounded when the "N" signal pulses are transmitted over lead 19 and slip ring 9. On the other hand, if wiper 4 is immediately opposite wiper 39, no "A" signal will be heard since wiper 4 will be grounded when the pulses of this signal are transmitted. At any intermediate position in this range, however, both signals will appear on wiper 4, in amounts proportional to the respective distances between wiper 4 and wipers 37 and 39. Accordingly, at this time the pilot will hear both the "A" and "N" signals, one predominating to indicate the direction in which position correction is required.

The pilot will accordingly maneuver the trainer until both signals are heard equally, at which time he is said to be "on the beam" and his position is in a line with the station corresponding to the particular course leg which he is flying. This condition will occur at the time when wiper 4 is exactly between wipers 37 and 39, receiving both "A" and "N" signals of equal volume. Since the "A" and "N" signals transmitted are complementary, as pointed out in connection with the description of modulator 55, when both signals are received simultaneously the "gaps" between the signal pulses of one signal are filled by the signal pulses of the other signal and a solid tone is heard in headphones 68. By observing the progress of needle 32 on plate 7 as shown in Fig. 4, the instructor can monitor the pilot's operations in attempting to maneuver the trainer onto one of the course legs in the manner just described. Therefore, a realistic simulation of the range navigation procedure is provided.

During the station identification portion of the operating cycle, the operation of the equipment is as follows. First, assume that cam 78 is in the position where follower 79 just engages the leading portion of the depressed space of the cam. Accordingly, leads 84 and 86 will be connected to leads 18 and 19 over switch arm 82 and contact 81 and switch arm 88 and contact 87, respectively. Cam 100 may be set so that follower 99 is just entering the depressed portion of cam 100 as follower 79 enters the depressed portion of cam 78 or it may be set so that follower 99 engages the raised portion of cam 100 at this time. However, for purposes of illustration, assume that follower 99 is set so that it is just entering the depressed portion of cam 100. At this time, lead 18 is connected to terminal 96 over a circuit including switch arm 82, contact 81, lead 84, switch arm 85, and contact 91. Lead 19 is grounded over a circuit including switch arm 88, contact 87, lead 86, switch arm 90, and contact 93 to ground at 94. The call letters TIK will be impressed on terminal 96 over switch arm 97 and contact 108 from source 43 through resistor 111. At this time, slip ring 9 is grounded and slip ring 10 is modulated with station identification call letter pulses. Assuming that wiper 4 is between wipers 36 and 37 on resistance winding 5, the call signal will be transmitted to slip ring 3 and thence to earphones 68 through lead 26 and amplifier 71. If wiper 4 is between wipers 39 and 37, the call letter signals will be heard in reduced volume as the wiper approaches grounded wiper 39. If wiper 4 is between wipers 39 and 40, no signal will be heard during the first portion of the identification cycle since this portion of resistance 5 is grounded at 39 and 40.

During the second half of the identification cycle, with the raised portion of cam 100 engaging follower 99 and switch arms 85 and 90 engaging their respective contacts 92 and 95, lead 18 is grounded over a circuit including arm 82, contact 81, lead 84, arm 85, contact 92 and ground at 94. The second cycle of station call letter modulation impressed on terminal 96 is applied to lead 19 through contact 95, arm 90, lead 86, contact 87, arm 88, and thence to lead 19. At this time, slip ring 10 and wipers 36, 37, 42 and 17 are grounded. The station call signal is impressed on slip ring 9 and wipers 22, 39, 40, and 16. Accordingly, wiper 4 will receive the station call signal at full strength if positioned between wipers such as 39 and 40, at intermediate strength between wipers such as 39 and 37, and will receive no signal between wipers such as 37 and 36. It will be apparent from the foregoing that if the pilot is manipulating the trainer such that wiper 4 is between wipers such as 39 and 37, corresponding to the region near one of the course legs, he will hear the station call signal repeated. If he is exactly on the beam, both transmissions of the signal will be at the same volume, whereas if he is on one side or the other of the beam, either the first or the second transmission of the station call signal will predominate. This result simulates that found in actual radio range operation.

While I have described a specific embodiment of my invention in detail, it will be apparent to those skilled in the art that many changes and modifications may be made in the embodiment disclosed without departing from the scope of the invention. Accordingly, I do not wish to be limited to the details shown, but only by the scope of the following claims.

Having thus described my invention, what I claim is:

1. In a radio range course simulator, in combination, a closed potentiometer winding, first and second current collecting means fixedly mounted with respect to said winding, signal generating means for alternately applying complementary electrical code pulses of audio frequency voltage to said first and second current collecting means, a plurality of members adjustably mounted for rotation about said winding, a first wiper mounted on each member and contacting said first current collecting means and said winding, a second wiper mounted in spaced relation to said first wiper on each member and contacting said second current collecting means and said winding, means for alternately grounding each of said first wipers and each of said second wipers, an output wiper mounted for adjustable contact with said winding, and means responsive to the voltage on said output wiper for producing an audible signal.

2. Apparatus of the class described, comprising, in combination, a closed impedance winding, first and second current collecting means fixedly mounted with respect to said winding, signal generating means for alternately applying code pulses of audio frequency voltage to said first current collecting means while grounding said second current collecting means and applying complementary pulses to said second current collecting means while grounding said first current collecting means, a plurality of members adjustably mounted for rotation about said winding, a first wiper mounted on each member and contacting said first current collecting means and said winding, a second wiper mounted in spaced relation to said first wiper on each member and contacting said second current collecting means and said winding, an output wiper mounted for adjustable contact with said winding, means responsive to the voltage on said output wiper for producing an audible signal, and means for positioning said output wiper in response to the simulated bearing of an aircraft with respect to a range station.

3. A radio range course simulator, comprising, in combination, a bearing indicator dial, a first pointer on said dial for indicating the simulated bearing of an aircraft with respect to a range station, second, third, fourth and fifth manually adjustable pointers on said dial for indicating the simulated bearings of course legs with respect to said range station, a closed potentiometer winding mounted concentrically with said dial, an output wiper engaging said winding, means responsive to the simulated bearing of said aircraft with respect to said range station for simultaneously adjusting said first pointer and said output wiper, members attached to said second, third, fourth and fifth pointers, said members being mounted for movement about said winding, a first input wiper attached to each member and contacting said winding, a second input wiper attached to each member, said second wipers being insulated from said first input wipers and contacting said winding at points spaced from said first input wipers, means for applying a first series of code pulses to said first input wipers while grounding said second input wipers, means for applying a second series of code pulses complementary to said first series of said second input wipers while grounding said first input wipers, and a pilot's listening device connected to said output wiper for generating an audible signal simulating that which would be received by an aircraft having the bearing indicated by said first pointer while in the vicinity of a range station having the course legs indicated by said second, third, fourth and fifth pointers.

4. An aural and visual simulated radio range course indicator device, comprising, in combination, a circular plate having a first side bearing angular indicia, a rotatable shaft mounted centrally in said plate, a marker mounted on said shaft on said first side of said plate for cooperation with said indicia, a closed potentiometer winding mounted concentrically with said shaft on a second side of said plate opposite said first side, an output wiper mounted on said shaft and slidably contacting said winding, a plurality of members mounted on said second side of said plate and movable about said winding, a marker attached to each member and extending to said first side of said plate for cooperation with said indicia, a pair of spaced wipers mounted on each member and contacting said winding, means for alternately grounding a first wiper of each of said pairs while applying coded energy to the second wiper of said pairs and grounding said second wipers while applying complementary coded energy to said first wipers, and means connected to said output wiper and responsive to coded energy applied thereto for producing an audible signal.

5. In a radio range course simulator, in combination, a closed impedance winding, first and second current collecting means fixedly mounted with respect to said winding, signal generating means for alternately applying code pulses of audio frequency voltage to said first current collecting means while grounding said second current collecting means and applying code pulses to said second current collecting means while grounding said first current collecting means, first wiper means contacting said first current collecting means and said winding at a plurality of points, second wiper means contacting said second current collecting means and said winding at a plurality of points, an output wiper mounted for adjustable contact with said winding, means responsive to the voltage on said output wiper for producing an audible signal, and means for positioning said output wiper in response to the simulated bearing of an aircraft with respect to a range station.

6. Means for simulating a radio range signal, comprising, in combination, a pair of terminals adapted to be connected to a source of alternating voltage having a frequency in the audible range, first and second switches each having first and second contacts, first impedance means connecting said first contacts in parallel to a first terminal of said pair, second impedance means connecting said second contacts to a second terminal of said pair, a contact arm in each of said switches movable between a first position engaging said first contacts and a second position engaging said second contacts, means for moving said contact arm between said first and second positions as a predetermined function of time, first current collecting means connected to the contact arm of said first switch, second current collecting means connected to the contact arm of said second switch, means for alternately grounding said second contacts of said first and second switches for alternately connecting said first and second current collecting means to ground, other impedance means forming a closed curve, a first plurality of wipers mounted for adjustable contact with said other impedance means and contacting said first current collecting means, a second plurality of wipers each mounted for adjustable contact with said other impedance means in spaced relation to one of said first plurality of wipers and contacting said second current collecting means, third current collecting means, an output wiper mounted for adjustable contact with said other impedance means along said closed curve and contacting said third current collecting means, means responsive to the simulated bearing of an aircraft with respect to a range station for adjusting said output wiper, and a listening device connected between said second terminal and said third current collecting means.

References Cited in the file of this patent

UNITED STATES PATENTS

| | | |
|---|---|---|
| 2,441,136 | Charles et al. | May 11, 1948 |
| 2,485,262 | Decker | Oct. 18, 1949 |
| 2,510,385 | Dehmel | June 6, 1950 |
| 2,621,425 | Heald | Dec. 16, 1952 |